US011812353B2

(12) United States Patent
Shikari et al.

(10) Patent No.: US 11,812,353 B2
(45) Date of Patent: Nov. 7, 2023

(54) NETWORK ASSISTED EMERGENCY MONITORING

(71) Applicant: Apple Inc., Cupertino, CA (US)

(72) Inventors: Murtaza A. Shikari, Mountain View, CA (US); Dawei Zhang, Saratoga, CA (US); Fangli Xu, Beijing (CN); Haijing Hu, Beijing (CN); Longda Xing, San Jose, CA (US); Sethuraman Gurumoorthy, San Jose, CA (US); Sree Ram Kodali, San Jose, CA (US); Srinivasan Nimmala, San Jose, CA (US); Srirang A. Lovlekar, Cupertino, CA (US); Yuqin Chen, Shenzhen (CN); Muthukumaran Dhanapal, Sunnyvale, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/250,005

(22) PCT Filed: Feb. 14, 2019

(86) PCT No.: PCT/CN2019/075059
§ 371 (c)(1),
(2) Date: Oct. 28, 2020

(87) PCT Pub. No.: WO2020/164045
PCT Pub. Date: Aug. 20, 2020

(65) Prior Publication Data
US 2021/0235252 A1 Jul. 29, 2021

(51) Int. Cl.
*H04W 4/90* (2018.01)
*H04W 76/28* (2018.01)
(Continued)

(52) U.S. Cl.
CPC ............. *H04W 4/90* (2018.02); *H04W 72/23* (2023.01); *H04W 76/28* (2018.02); *H04W 76/50* (2018.02)

(58) Field of Classification Search
CPC ..... H04W 4/90; H04W 72/042; H04W 76/28; H04W 76/50
(Continued)

(56) References Cited

U.S. PATENT DOCUMENTS 8,868,026 B2 10/2014 Dhomeja
2013/0114484 A1* 5/2013 Suzuki ................ H04W 72/082
370/329
(Continued)

FOREIGN PATENT DOCUMENTS

CN 101686091 3/2010

*Primary Examiner* — Joel Ajayi
(74) *Attorney, Agent, or Firm* — Fay Kaplun & Marcin, LLP (57) ABSTRACT

A user equipment (UE) is associated with a cellular network, the UE and the cellular network are configured with a Discontinuous Reception (DRX) functionality, the DRX functionality including a cycle with a plurality of onDurations. The UE receives an indication of at least one parameter the cellular network is to utilize for the transmission of an emergency message, generates a monitoring schedule based on the indication of the at least one parameter, wherein the monitoring schedule does not include at least one of the plurality of onDurations and activates a mode of operation where the UE monitors for the emergency message based on the monitoring schedule.

16 Claims, 7 Drawing Sheets

(51) Int. Cl.
*H04W 76/50* (2018.01)
*H04W 72/23* (2023.01)
(58) Field of Classification Search
USPC .................................................. 455/404.1
See application file for complete search history.

(56) References Cited

U.S. PATENT DOCUMENTS

2017/0181218 A1   6/2017  Liu et al.
2017/0230932 A1*  8/2017  Challa .................. H04W 76/28
2017/0280473 A1*  9/2017  Krishnamoorthy ..........................
                                                H04W 52/0216

* cited by examiner

Table 500

| CMAS Scheduling Index Value 502 | Paging Repetitions 504 | DRX Cycles Between Each Repetition 506 |
|---|---|---|
| 0 | 2 | 1 |
| 1 | 2 | 2 |
| 2 | 4 | 1 |
| 3 | 4 | 2 |
| 4 | 8 | 4 |
| 5 | 8 | 4 |
| 6 | 16 | 16 |

NETWORK ASSISTED EMERGENCY MONITORING

BACKGROUND

A user equipment (UE) may be configured to establish a connection to at least one of a plurality of different networks or types of networks. At any moment, the network may be configured to broadcast an emergency message to UEs within a particular area.

During the connection with the network, the UE may transition between operating states. One operating state may be a connected state where the UE and the network may be configured to exchange information and/or data. Another operating state may be an idle state. During the idle state, the UE and the network are not configured to exchange data. However, the UE may monitor the downlink for transmissions sent from the network. For example, in the idle state, the UE may be configured with a discontinuous reception (DRX) functionality that includes scheduled onDurations during which the UE performs operations to receive transmissions from the network. When DRX functionality is enabled and an onDuration is not scheduled, the UE has an opportunity to enter a sleep mode and conserve power.

For a variety of different reasons, the UE may activate a power efficient mode of operation during which transmissions related to emergency messages are processed and other operations related to the cellular network connection are limited. Thus, during the onDurations of the DRX cycle, the UE may be configured to only process transmissions from the network that are related to emergency messages. However, the broadcast of an emergency message is a rare event. Accordingly, the UE may experience a significant power drain monitoring for emergency messages that are unlikely to be transmitted.

SUMMARY

In an exemplary embodiment, a method is performed by a user equipment (UE) associated with a cellular network, the UE and the cellular network configured with a Discontinuous Reception (DRX) functionality, the DRX functionality including a cycle with a plurality of onDurations. The method includes receiving an indication of at least one parameter the cellular network is to utilize for the transmission of an emergency message, generating a monitoring schedule based on the indication of the at least one parameter, wherein the monitoring schedule does not include at least one of the plurality of onDurations and activating a mode of operation where the UE monitors for the emergency message based on the monitoring schedule.

In another exemplary embodiment, a user equipment (UE) having a transceiver and a processor is described. The transceiver is configured to establish a connection with a cellular network, the UE and the cellular network configured with a Discontinuous Reception (DRX) functionality, the DRX functionality including a cycle with a plurality of onDurations. The processor is configured to perform operations including receiving an indication of at least one parameter the cellular network is to utilize for the transmission of an emergency message, generating a monitoring schedule based on the indication of the at least one parameter, wherein the monitoring schedule does not include at least one of the plurality of onDurations and activating a mode of operation where the UE monitors for the emergency message based on the monitoring schedule.

In a further exemplary embodiment, a method is performed by a base station having at least one associated user equipment (UE) operating in a radio resource control (RRC) idle state. The method includes transmitting information corresponding to an emergency message pattern that the base station is to utilize for the transmission of an emergency message, receiving a request to transmit the emergency message and transmitting the emergency message a plurality of times based on the emergency message pattern.

DETAILED DESCRIPTION

The exemplary embodiments may be further understood with reference to the following description and the related appended drawings, wherein like elements are provided with the same reference numerals. The exemplary embodiments are related to a device, system and method for power optimization related to emergency message monitoring performed by a user equipment (UE). For example, the exemplary embodiments may relate to signaling provided by the network that enables the UE to limit the duration in which the UE is in an active mode of processing to monitor for emergency messages transmitted by the network.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The UE may establish a connection to at least one of a plurality of different networks or types of networks. The UE and the network may communicate via a base station of the corresponding network. In one example, the network may be a Long Term Evolution (LTE) network and the base station may be an Evolved Node B (eNB). In another example, the network may be a 5G new radio (NR) network and the base station may be a next generation Node B (gNB). However, reference to a particular network or a particular type of base station is merely provided for illustrative purposes. Those skilled in the art will understand that the network may be any type of network and the base station may be any type of base station within the corresponding network.

The exemplary embodiments are described with regard to a Commercial Mobile Alert System (CMAS) message. Throughout this description, the CMAS message may refer to data transmitted by the network that includes a type of emergency alert. Exemplary emergency alerts include, but are not limited to, a presidential alert, a weather alert, a public safety alert, an Amber alert, a blue alert or an imminent threat. Reference to a CMAS message or any particular type of emergency alert is merely for illustrative purposes. Different systems and/or entities such as, but not limited to, a Wireless Emergency Alert (WEA) system, an Earthquake and Tsunami Warning System (ETWS) or a Public Warning System (PWS) provide similar types of emergency messages. Accordingly, the exemplary embodiments are not limited to CMAS messages or any particular type of emergency alert. The exemplary embodiments may apply to any signal transmitted by the network that includes any type of emergency alert. Typically, it maybe considered that emergency alerts are messages that are sent by a network that a UE is required to receive and process for the UE (or manufacturer) to claim that the UE is compatible with the type of network.

A UE connected to the LTE network may utilize a predetermined manner of monitoring for paging messages. A paging message may include an indication for a subsequently scheduled CMAS message. To monitor for paging messages, the UE may be configured with discontinuous reception (DRX) functionality. The DRX cycle relates to the UE utilizing an active mode of processing at defined intervals. During the active mode of processing, the UE (e.g., a baseband processor) is configured to monitor the physical downlink control channel (PDCCH) for paging messages transmitted by the network. The paging message may indicate to the UE that a subsequent message (e.g., CMAS message) is scheduled on the physical downlink shared channel (PDSCH). Throughout this description, an indication of a subsequently scheduled CMAS messages may be referred to as a CMAS indication.

The time period during which the UE is configured to be in the active mode of processing to monitor the PDCCH for paging messages may be referred to as an onDuration. For instance, during the onDuration the UE may tune its transceiver to the downlink to monitor for paging messages transmitted by the network via the PDCCH. When an onDuration is not scheduled, the UE may have an opportunity to utilize the sleep mode of inactivity based on the DRX cycle (e.g., turning the receiver chain of a transceiver off). Those skilled in the art will understand that other networks such as 5G networks may utilize a discontinuous reception cycle similar to DRX. Thus, the functionalities described herein may also be implemented for UEs that connect to 5G networks.

A DRX cycle may have a predetermined duration N such as 2560 milliseconds (ms), 1280 ms, 640 ms, etc. For example, at a time 0, there may be an onDuration during which the active mode of processing is used. Subsequently, upon the conclusion of the onDuration, the UE has an opportunity to utilize the sleep mode of inactivity and conserve power. At time N, the DRX cycle concludes and a further DRX cycle may begin. For example, if the UE received a paging message via the PDCCH during the onDuration, the UE may utilize the active mode of processing for at least a portion of the remaining DRX cycle to receive the data indicated by the paging message. If the UE did not receive any paging messages during the onDuration, the UE may utilize the sleep mode of inactivity for the remaining portion of the DRX cycle. The further DRX cycle may include a further onDuration, during which the UE once again monitors the PDCCH for paging messages. Upon conclusion of the further onDuration, the UE once again has an opportunity to utilize the sleep mode of inactivity and conserve power. The further DRX cycle concludes at time 2N. This process may continue until a predetermined condition occurs. Thus, the UE may be configured with a plurality of consecutive DRX cycles.

A person of ordinary skill in the art would understand that sleep mode does not necessarily mean putting the processor, the transmitter, and the receiver of the UE to sleep, in hibernation, or in deactivation. For example, the processor may continue to execute other applications or processes. The sleep mode relates to conserving power by discontinuing a continuous processing functionality relating to operations that enable the UE to receive data that may be transmitted by the network. A DRX cycle configured in time units (e.g., ms) is merely for illustrative purposes, the exemplary embodiments may utilize a DRX cycle that is based on subframes, radio frames or any other suitable unit of time.

For a variety of different reasons, the UE may activate a power efficient mode of operation during which information and/or data related to CMAS messages are processed while other operations related to the cellular network connection are limited, omitted and/or delayed. Throughout this description, this mode of operation may be referred to as CMAS mode. However, reference to CMAS mode is merely exemplary, as there may be similar modes of operation referred to by different names.

The UE may be configured with DRX functionality and CMAS mode simultaneously. Accordingly, in this conventional configuration, during the onDuration for each DRX cycle the UE (e.g., the baseband processor) may monitor the PDCCH. Information transmitted by the network over the PDCCH may be decoded by the UE. Subsequently, from this decoded information, only CMAS indications or another type of information related to the broadcast of CMAS messages may be processed. Information and/or data related to other operations may be discarded or buffered because in CMAS mode other operations related to the cellular network connection may be limited, omitted and/or delayed. However, the broadcast of a CMAS message is a rare event. Accordingly, the UE consumes power each DRX cycle monitoring for CMAS indications that are unlikely to be transmitted by the network.

The network may be configured to periodically retransmit the CMAS indication and/or the CMAS message in a pattern. Periodic retransmission of the CMAS indication and/or the CMAS message increases the likelihood that UEs within a particular area may successfully receive the CMAS message. The pattern may be based on a plurality of factors, including but not limited to, the hardware/software and/or firmware capabilities of the network entities configured to distribute the CMAS message to a particular area, the hardware/software and/or firmware capabilities of the UEs within the particular area, the number of ongoing CMAS transmission patterns, battery life, the effect the pattern may have on network traffic or any combination thereof.

The exemplary embodiments may relate to signaling performed by the network that provides the UE with an indication of the parameters the network may be configured to utilize for the periodic retransmission of the CMAS indication and/or the CMAS message. Subsequently, the UE may alter its configuration to adapt its DRX cycle to an updated CMAS monitoring schedule. The updated CMAS monitoring schedule is based on the indication of the parameters to be utilized by the network for the periodic retransmission of the CMAS indication and/or the CMAS message. Throughout this description, operating in accordance with the updated CMAS monitoring schedule may be referred to as updated CMAS mode.

Figure 1:
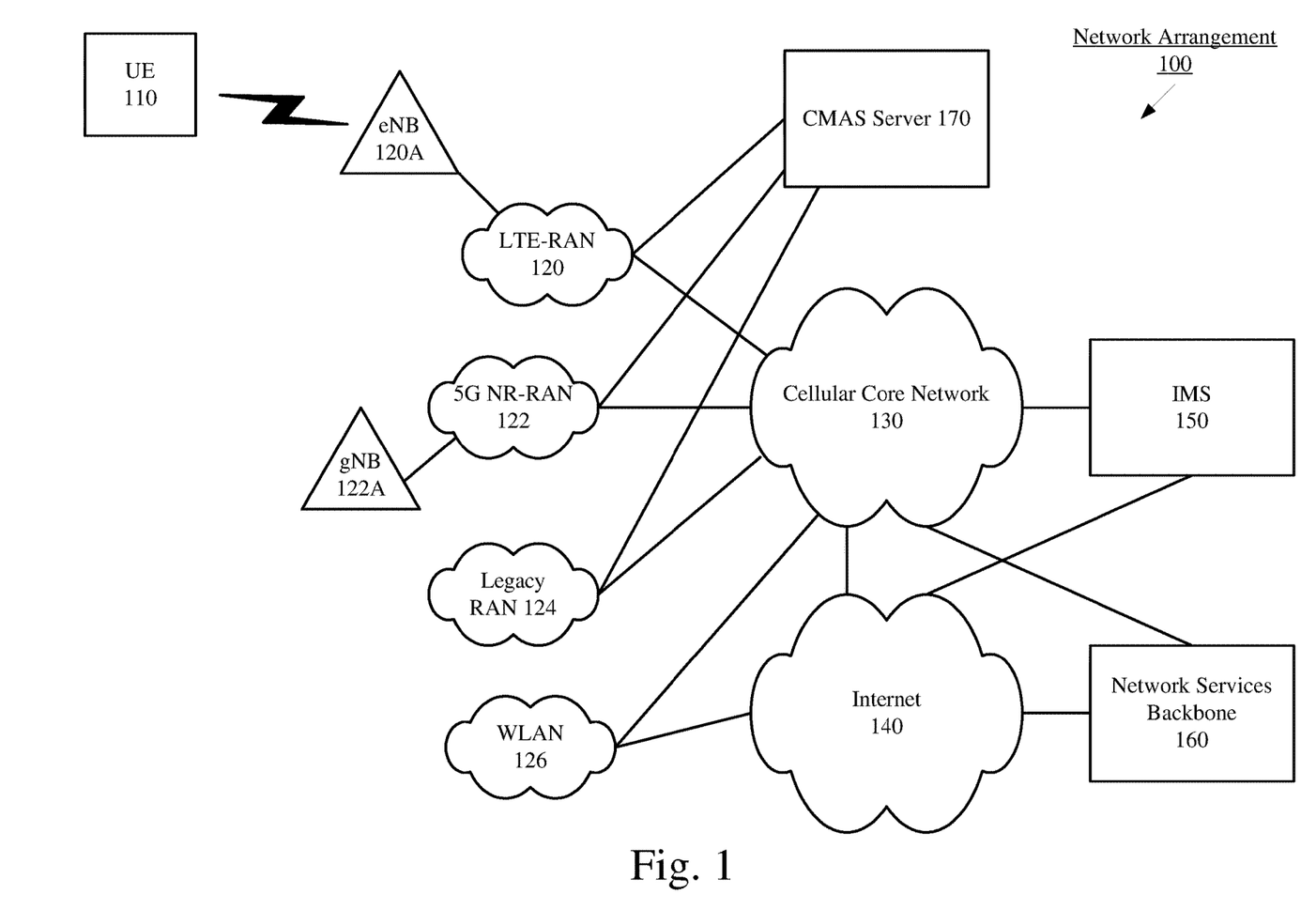
FIG. 1 shows an exemplary network arrangement according to various exemplary embodiments described herein.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate directly with one or more networks. In the example of the network configuration 100, the networks with which the UE 110 may wirelessly communicate are a LTE radio access network (LTE-RAN) 120, a 5G New Radio (NR) radio access network (5G NR-RAN) 122, a legacy radio access network (RAN) 124 and a wireless local access network (WLAN) 126. However, it should be understood that the UE 110 may also communicate with other types of networks and the UE 110 may also communicate with networks over a wired connection. Therefore, the UE 110 may include a LTE chipset to communicate with the LTE-RAN 120, a 5G NR chipset to communicate with the 5G NR-RAN 122, a legacy chipset to communicate with the legacy RAN 124 and a WLAN chipset to communicate with the WLAN 126.

The LTE-RAN 120, the 5G NR-RAN 122 and the legacy RAN 124 may be portions of cellular networks that may be deployed by cellular providers (e.g., Verizon, AT&T, Sprint, T-Mobile, etc.). These networks 120, 122, 124 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 126 may include any type of wireless local area network (WiFi, Hot Spot, IEEE 802.11x networks, etc.).

The UE 110 may connect to the LTE-RAN 120 via an evolved Node B (eNB) 120A. Those skilled in the art will understand that any association procedure may be performed for the UE 110 to connect to the LTE-RAN 120. For example, as discussed above, the LTE-RAN 120 may be associated with a particular cellular provider where the UE 110 and/or the user thereof has a contract and credential information (e.g., stored on a SIM card). Upon detecting the presence of the LTE-RAN 120, the UE 110 may transmit the corresponding credential information to associate with the LTE-RAN 120. More specifically, the UE 110 may associate with a specific base station (e.g., the eNB 120A of the LTE-RAN 120). As mentioned above, the use of the LTE-RAN 120 is for illustrative purposes and any type of network may be used. For example, the UE 110 may also connect to the 5G NR-RAN 122 via the next generation Node B (gNB) 122A.

In addition to the networks 120, 122, 124 and 126 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The network arrangement 100 may further include a CMAS server 170 that may generate emergency messages and/or emergency message indications (e.g., pings) to be broadcast over the cellular networks 120, 122, 124 to the UE 110. Since the CMAS messages are only broadcast over a cellular network, to comply with various regulations and/or standards the UE 110 may remain connected, in some manner, to a cellular network, even when the UE 110 has established a connection to a non-cellular network such as the WLAN 126. The network arrangement 100 shows the CMAS server 170 directly connected each cellular network (e.g., LTE-RAN 120, 5G NR-RAN 122, Legacy RAN 124). However, this is merely for illustrative purposes, CMAS server 170 may be connected to the cellular networks via the cellular core network 130.

Figure 2:
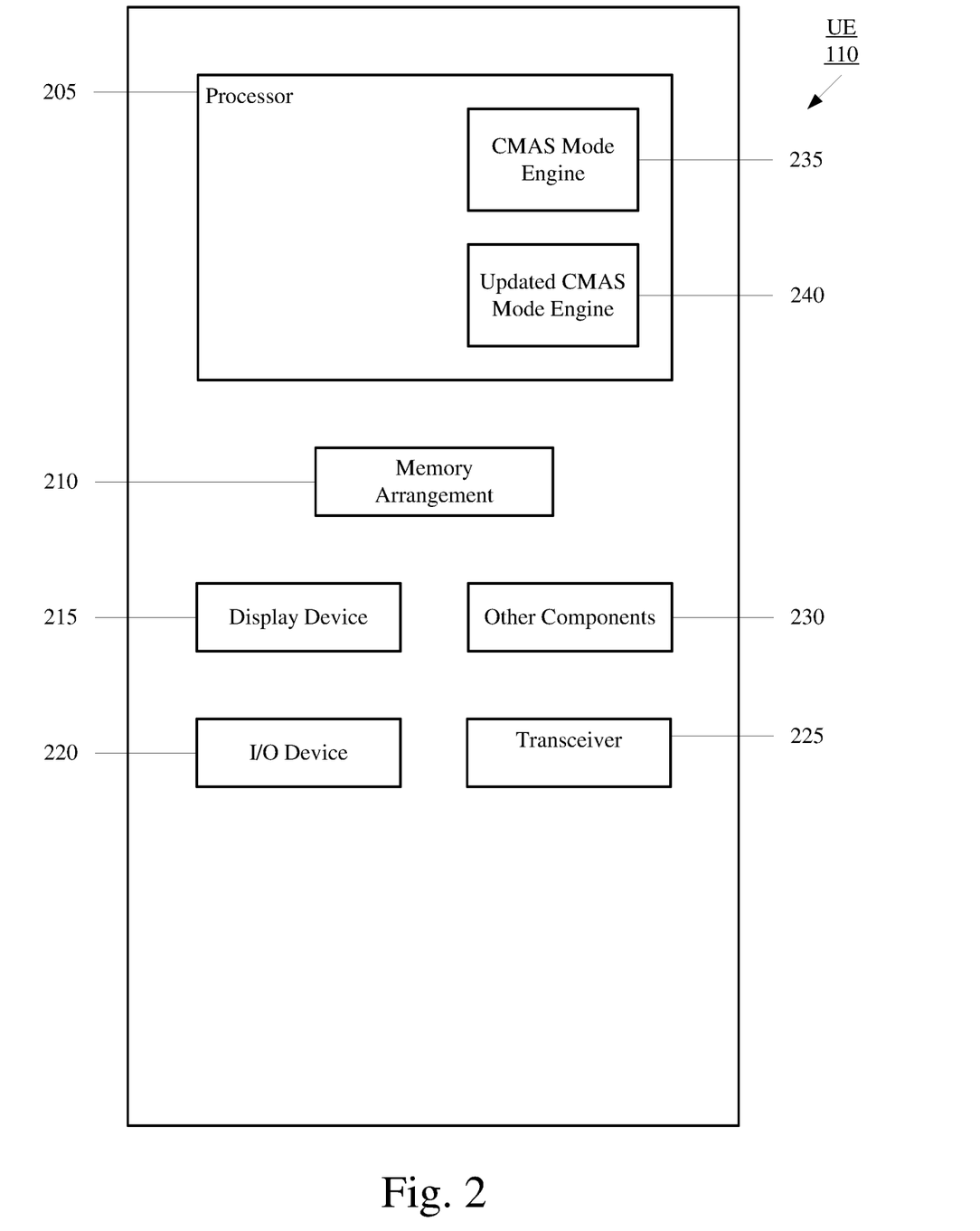
FIG. 2 shows an exemplary UE according to various exemplary embodiments described herein.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines of the UE 110. For example, the engines may include a CMAS mode engine 235 and an updated CMAS mode engine 240. The CMAS mode engine 235 may activate and deactivate CMAS mode. Accordingly, the CMAS mode engine 235 may enable the UE 110 to monitor the downlink for CMAS indications on a per DRX cycle basis. The updated CMAS mode engine 240 may to activate and deactivate updated CMAS mode. Accordingly, the updated CMAS mode engine 240 may generate an updated CMAS monitoring schedule based on information received from the network. Subsequently, the UE 110 may monitor the downlink for CMAS indications in accordance with the updated CMAS monitoring schedule.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. As will be described in further detail below, the memory 210 may store data associated with the conditions of the UE 110 when a determination of the operating mode is performed. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the 5G NR-RAN 122, the legacy RAN 124, the WLAN 126, etc. Accordingly, the transceiver 225 may operate on a variety of different frequencies or channels (e.g., set of consecutive frequencies).

When connected to the LTE-RAN 120, the UE 110 may be configured to be in one of a plurality of different operating states. One operating state may be characterized as RRC idle state and another operating state may be characterized as RRC connected state. RRC refers to the radio resource control (RRC) protocols. Those skilled in the art will understand that when the UE 110 is in RRC connected state, the UE 110 and the LTE-RAN 120 may be configured to exchange information and/or data. The exchange of information and/or data may allow the UE 110 to perform functionalities available via the network connection. Further, those skilled in the art will understand that when the UE 110 is connected to the LTE-RAN 120 and in RRC idle state the UE 110 is generally not exchanging data with the network and radio resources are not being assigned to the UE 110 within the network. However, when the UE 110 is in RRC idle state, the UE 110 may monitor for information and/or data transmitted by the network. Those skilled in the art will understand that the RRC idle and connected states are terms associated with an LTE network. Throughout this description these terms are being used generally to describe states the UE 110 may be in when connected to any network and that exhibit the characteristics described above for the RRC idle and RRC connected states.

When the UE 110 is camped on a first cell of a first network in an RRC idle state, the UE 110 may not be able to exchange data with the network. To exchange data with the network the UE 110 may transition from the RRC idle state to the RRC connected state. For example, while in RRC idle state the UE 110 may listen for information such as but not limited to, primary synchronization signals (PSS) and secondary synchronization signals (SSS), Master Information Block (MIB), broadcast messages, System Information Block (SIB), paging messages etc. In response, the UE 110 may issue a request to the network that indicates that the UE 110 wants to be moved to the RRC connected state. A successful transition from the RRC idle state to the RRC connected state may include the exchange of messages between the UE 110 and the first cell of the first network. In the RRC connected state, a network context may be established between the first cell of the first network and the UE 110. Thus, the UE 110 may be assigned radio resources and the UE 110 may be able to exchange data with the network. Transitioning from a RRC connected state to a RRC idle state may be referred to as RRC connection release and transitioning from a RRC idle state to a RRC connected state may be referred to as RRC connection setup or RRC connection reestablishment. However, reference to RRC connection setup, RRC connection reestablishment and RRC connection release is merely provided for illustrative purposes. Other networks may refer to similar operations by different names.

The exemplary embodiments are not limited to RRC connected state and RRC idle state. For example, when the UE 110 is operating within the 5G NR-RAN 122, the UE 110 may be configured to be in an RRC inactive state. In RRC inactive mode, the UE 110 maintains an RRC connection while minimizing signaling and power consumption. As described above, reference to any particular operating state is merely provided for illustrative purposes, the exemplary embodiments may apply to any suitable operating state for the UE 110.

When in RRC idle state, the UE 110 may be configured with DRX functionality. For instance, in one exemplary scenario, the eNB 120A of the LTE-RAN 120 may broadcast a SIB 2. The SIB 2 may include, in part, DRX parameters. Based on these parameters, the UE 110 may determine the subframes during which the network may transmit information to the UE 110 on the PDCCH. Subsequently, the UE 110 schedules onDurations to coincide with the subframes during which the network may transmit information to the UE 110 on the PDCCH.

The UE 110 may be configured with DRX functionality and CMAS mode simultaneously. CMAS mode may be considered a power efficient mode of operation and thus, activating CMAS mode may provide power saving benefits to the UE 110. As mentioned above, during CMAS mode, the UE 110 may process information and/or data related to CMAS messages while other operations related to the cellular network connection are limited, omitted and/or delayed. In this configuration, the UE 110 may be monitoring the PDCCH at least once per DRX cycle to determine whether a CMAS indication has been transmitted by the network. However, CMAS messages are rare and thus, the UE 110 may experience a power drain monitoring for CMAS indications that are unlikely to occur. The exemplary embodiments relate to utilizing updated CMAS mode where the UE 110 is configured to monitor the PDCCH for CMAS indications less frequently than CMAS mode.

Figure 3A:
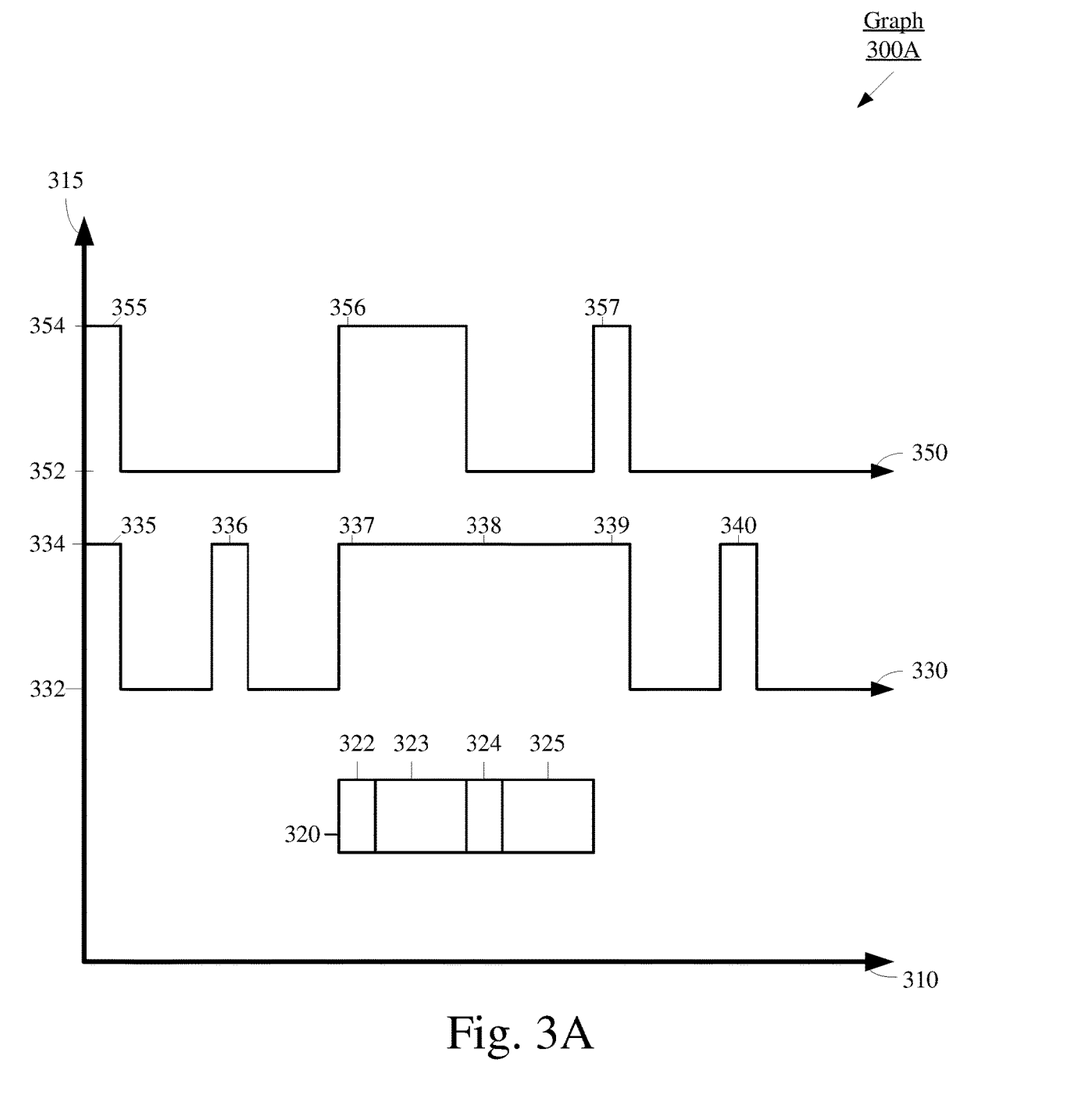
FIG. 3A shows a graph that provides an example of when a UE that is operating in CMAS mode may be in an active mode of processing in response to a CMAS message and when a UE that is operating in updated CMAS mode may be in an active mode of processing in response to the CMAS message according to various exemplary embodiments.

FIG. 3A shows a graph 300A that provides an example of when a UE 110 that is operating in CMAS mode may be in an active mode of processing in response to a CMAS message and when a UE 110 that is operating in updated CMAS mode may be in an active mode of processing in response to the CMAS message according to various exemplary embodiments. The graph 300A will be described with regard to the network arrangement 100 of FIG. 1 and the UE 110 of FIG. 2.

Consider an exemplary scenario where the UE is camped on the eNB 120A of the LTE-RAN 120. The UE 110 is in the RRC idle state and configured with DRX functionality. When a CMAS message is triggered, the network may transmit the CMAS indication and the CMAS message over a first duration and retransmit the CMAS indication and the CMAS messages over a second duration immediately subsequent to the first duration.

The graph 300A includes a timeline 320 and two line graphs 330 and 350. The timeline 320 illustrates when the transmission and retransmission of the CMAS indication and the CMAS message occurs. The line graph 330 illustrates when a UE 110 that is operating in CMAS mode may be in an active mode of processing in response to the timeline 320. The line graph 350 illustrates when a UE 110 that is operating in updated CMAS mode may be in an active mode of processing in response to the timeline 320. Accordingly, the graph 300A may demonstrate the power saving benefits of updated CMAS mode compared to CMAS mode.

The x-axis 310 represents time. The timeline 320 shows an initial CMAS indication 322, an initial CMAS message 323, a retransmitted CMAS indication 324 and a retransmitted CMAS message 325. In this exemplary scenario, the initial CMAS indication 322 may be transmitted in a paging message by the eNB 120A to the UE 110 via the PDCCH. The initial CMAS message 323 may be scheduled by the eNB 120A immediately after the initial CMAS indication 322. The eNB 120A may transmit the initial CMAS message 323 via the PDSCH in a SIB 12. The retransmitted CMAS indication 324 may be transmitted in a paging message by the eNB 120A to the UE 110 via the PDCCH. The retransmitted CMAS message 325 may be scheduled by the eNB 120A immediately after the retransmitted CMAS indication 323. The eNB 120A may transmit the retransmitted CMAS message 325 via the PDSCH in a SIB 12.

Line graph 330 represents the UE 110 in CMAS mode. The level of the line graph 330 on the y-axis 315 illustrates when the UE 110 may be in an active mode of processing in response to the timeline 320. When the line graph 330 is plotted along the x-axis at point 332 of the y-axis 315 the UE is not in an active mode of processing. When the line graph 330 is plotted along the x-axis 310 at point 334 of the y-axis 315 the UE 110 is in an active mode of processing.

In this exemplary scenario, when in CMAS mode, the UE 110 is configured with an onDuration 335. Accordingly, the UE 110 may be in an active mode of processing to monitor the PDCCH and determine whether the network has transmitted any CMAS indications. As demonstrated by the timeline 320, a CMAS indication is not scheduled during the onDuration 335. Upon conclusion of the onDuration 335, the UE 110 enters a sleep mode of inactivity to conserve power. The UE 110 experiences the same circumstances again during the onDuration 336.

During onDuration 337, the UE 110 detects the initial CMAS indication 322. Accordingly, upon conclusion of the onDuration 337, the UE 110 is configured to remain in the active mode of processing to receive the initial CMAS message 323 as indicated by the initial CMAS indication 322. When in CMAS mode, the UE 110 monitors the PDCCH every DRX cycle and is unaware that the network will retransmit the CMAS indication and CMAS message. Accordingly, during the onDuration 338 the UE 110 detects the retransmitted CMAS indication 324 and upon conclusion of the onDuration 338, the UE 110 remains in the active mode of processing to receive the retransmitted CMAS message 325.

During the onDuration 339, the UE 110 may be in an active mode of processing to monitor the PDCCH. As demonstrated by the timeline 320, a CMAS indication is not scheduled during the onDuration 339. Upon conclusion of the onDuration 339, the UE 110 enters a sleep mode of inactivity to conserve power. The UE 110 experiences the same circumstances again during the onDuration 340.

Line graph 350 represents the UE 110 in updated CMAS mode. The level of the line graph 350 on the y-axis 315 illustrates when the UE 110 may be in an active mode of processing in response to the timeline 320. When the line graph 350 is plotted along the x-axis 310 at point 352 of the y-axis 315 the UE is not in an active mode processing. When the line graph 350 is plotted along the x-axis 310 at point 354 of the y-axis 315 the UE 110 is in an active mode of processing.

In this exemplary scenario, the UE 110 may have received an indication from the network that if a CMAS message is triggered, the network is configured to transmit the CMAS indication and the CMAS message over a first duration. Subsequently, the network will retransmit the CMAS indication and the CMAS messages over a second duration immediately subsequent to the first duration. This is the behavior demonstrated by the timeline 320.

Based on the indication received from the network, the UE 110 may utilize an updated CMAS monitoring schedule. In this exemplary scenario, the updated CMAS monitoring schedule may be configured with a DRX cycle duration that enables the UE 110 to be in an active mode of processing during one of the first duration or the second duration and in a sleep mode of inactivity during the other duration.

During the onDuration 355, the UE 110 may be in an active mode of processing to monitor the PDCCH. As demonstrated by the timeline 320, a CMAS indication is not scheduled during the onDuration 355. Upon conclusion of the onDuration 355, the UE 110 enters a sleep mode of inactivity to conserve power.

During onDuration 356, the UE 110 detects the initial CMAS indication 322. Accordingly, upon conclusion of the onDuration 356, the UE 110 remains in the active mode of processing to receive the initial CMAS message 323 as indicated by the initial CMAS indication 322. Since there is no onDuration scheduled when the retransmitted CMAS indication 324 is transmitted, the UE 110 is able to conserve power instead of receiving a redundant retransmission.

During the onDuration 357, the UE 110 may be in an active mode of processing to monitor the PDCCH. As demonstrated by the timeline 320, a CMAS indication is not scheduled during the onDuration 357. Upon conclusion of the onDuration 357, the UE 110 enters a sleep mode of inactivity to conserve power.

A comparison of the line graph 330 and the line graph 350 illustrates the power saving benefits of the updated CMAS mode compared to CMAS mode. In this exemplary scenario, when the UE 110 is in updated CMAS mode, the UE 110 is able to experience significant power saving benefits by increasing the DRX cycle duration. This decreases the number of onDurations and thus, the amount of time the UE 110 is in an active mode of operation. It also enables the UE 110 to reduce the number of redundant retransmission received by the UE 110.

Figure 3B:
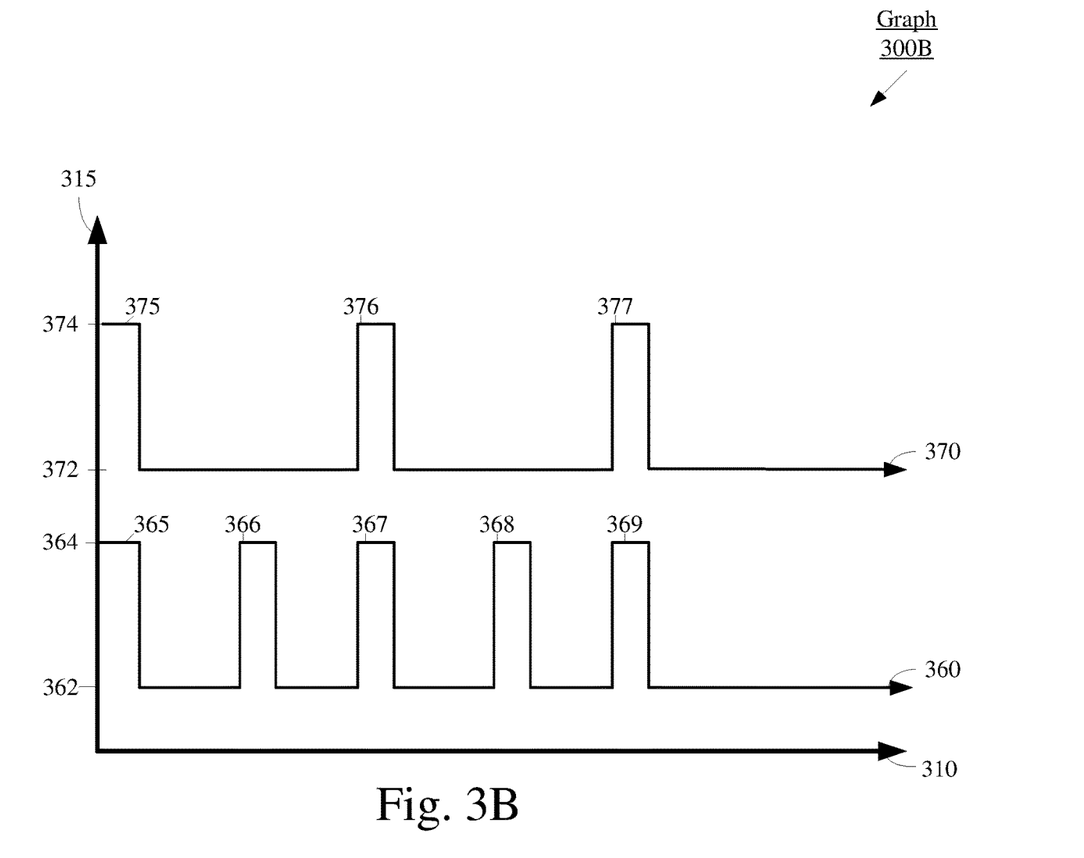
FIG. 3B shows a graph that provides an example of when a UE that is operating in CMAS mode may be in an active mode of processing and when a UE 110 that is operating in updated CMAS mode may be in an active mode of processing according to various exemplary embodiments.

FIG. 3B shows a graph 300B that provides an example of when a UE 110 that is operating in CMAS mode may be in an active mode of processing and when a UE 110 that is operating in updated CMAS mode may be in an active mode of processing according to various exemplary embodiments. The graph 300B will be described with regard to the network arrangement 100 of FIG. 1 and the UE 110 of FIG. 2.

Consider an exemplary scenario where the UE is camped on the eNB 120A of the LTE-RAN 120. The UE 110 is in the RRC idle state and configured with DRX functionality. Unlike the exemplary scenario described with regard to FIG. 3A, in this exemplary scenario the network does not transmit a CMAS indication or a CMAS message.

The graph 300B includes two line graphs 360 and 370. The line graph 360 illustrates when a UE 110 that is operating in CMAS mode may be in an active mode of processing. The line graph 370 illustrates when a UE 110 that is operating in updated CMAS mode may be in an active mode of processing. Accordingly, the graph 300B may demonstrate the power saving benefits of updated CMAS mode compared to CMAS mode.

Line graph 360 represents the UE 110 in CMAS mode. The level of the line graph 360 on the y-axis 315 illustrates when the UE 110 may be in an active mode of processing. When the line graph 360 is plotted along the x-axis 310 at point 362 of the y-axis 315 the UE is not in an active mode processing. When the line graph 360 is plotted along the x-axis 310 at point 364 of the y-axis 315 the UE 110 is in an active mode of processing.

In this exemplary scenario, in CMAS mode, the UE 110 is configured with onDurations 365, 366, 367, 368, 369. Accordingly, during each of the onDurations 365, 366, 367, 368, 369 the UE 110 may be in an active mode of processing to monitor the PDCCH and determine whether the network has transmitted any CMAS indications. Since no CMAS indications have been transmitted, upon conclusion of the onDurations 365, 366, 367, 368, 369 the UE 110 enters a sleep mode of inactivity to conserve power.

Line graph 370 represents the UE 110 in updated CMAS mode. The level of the line graph 370 on the y-axis 315 illustrates when the UE 110 may be in an active mode of processing. When the line graph 370 is plotted along the x-axis at point 372 of the y-axis 315 the UE is not in an active mode processing. When the line graph 370 is plotted along the x-axis 310 at point 374 of the y-axis 315 the UE 110 is in an active mode of processing.

In this exemplary scenario, the UE 110 may have received an indication from the network that if a CMAS message is triggered, the network is configured to transmit the CMAS indication and the CMAS message over a first duration. Subsequently, the network will retransmit the CMAS indication and the CMAS messages over a second duration immediately subsequent to the first duration. However, in this exemplary scenario, the network does not perform a transmission of the CMAS indication or the CMAS message. Based on the indication received from the network, the updated CMAS monitoring schedule may be configured with a DRX cycle duration that enables the UE 110 to be in an active mode of processing during one of the first duration or the second duration and in a sleep mode of inactivity during the other duration.

In this exemplary scenario, in updated CMAS mode, the UE 110 is configured with onDurations 375, 376, 377. Accordingly, during each of the onDurations 375, 376, 377 the UE 110 may be in an active mode of processing to monitor the PDCCH and determine whether the network has transmitted any CMAS indications. Since no CMAS indication are transmitted, upon conclusion of the onDurations 375, 376, 377 the UE 110 enters a sleep mode of inactivity to conserve power.

A comparison of the line graph 360 and the line graph 370 illustrates the power saving benefits of updated CMAS mode compared to CMAS mode. In this exemplary scenario, when the UE 110 is in updated CMAS mode, the UE 110 is able to experience significant power saving benefits by increasing the DRX cycle duration. This decreases the number of onDurations and thus, the amount of time the UE 110 is in an active mode of operation.

Figure 4:
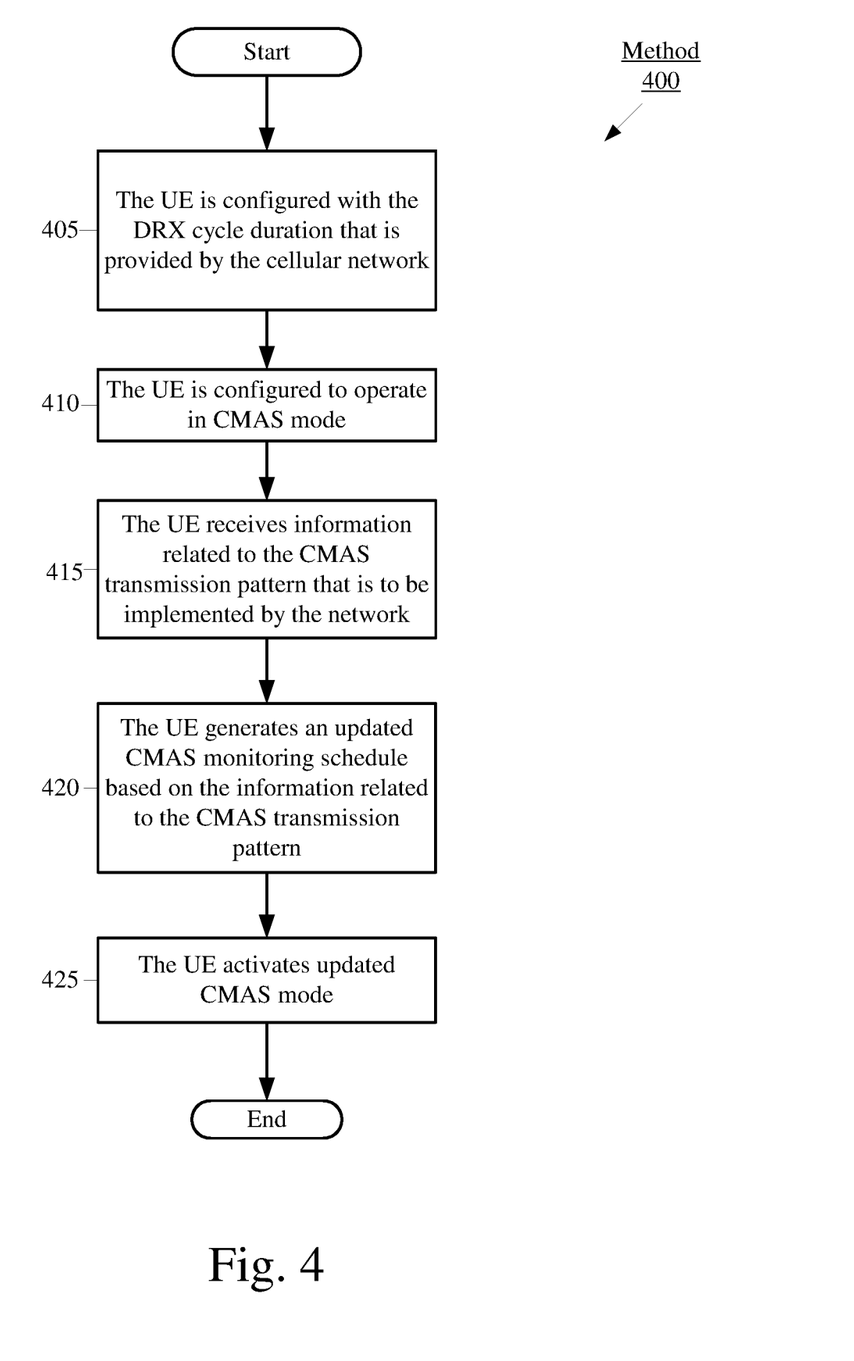
FIG. 4 shows an exemplary method for the UE to activate updated CMAS mode according to various exemplary embodiments.

FIG. 4 shows an exemplary method 400 for the UE 110 to activate updated CMAS mode according to various exemplary embodiments. The method 400 will be described with regard to the network arrangement 100 of FIG. 1 and the UE 110 of FIG. 2.

Consider the following exemplary scenario, the UE 110 is connected to the WLAN 126 and configured to access services via the WLAN 126. Since CMAS messages are only broadcast over a cellular network, to comply with various regulations and/or standards the UE 110 may remain connected, in some manner, to a cellular network, even when the UE 110 has established a connection to a non-cellular network (e.g., WLAN 126). Thus, the UE 110 is camped on the eNB 120A of the LTE-RAN 120 in the RRC idle state.

In 405, the UE 110 is configured with the DRX cycle duration that is provided by the cellular network. In this exemplary scenario the DRX cycle duration provided by the cellular network may be 1.28 seconds. During operation, the eNB 120A of the LTE-RAN 120 may broadcast a SIB 2. The SIB 2 may include information that indicates to the UE 110 the subframes during which the network may transmit paging messages to the UE 110 on the PDCCH. Subsequently, the UE 110 configures onDurations to coincide with the subframes during which the network may transmit paging messages to the UE 110 on the PDCCH. Thus, the onDurations for the UE 110 and the scheduled instances during which the cellular network may transmit a paging message to the UE 110 are synchronized. Reference to SIB 2 is merely exemplary, different networks may refer to similar information by a different name. The exemplary embodiments may apply to a cellular network that provides the UE 110 with a DRX cycle duration in any appropriate manner.

In 410, the UE 110 is configured to operate in CMAS mode. In this exemplary configuration, since the UE 110 has access to services via the WLAN 126, the UE 110 utilizes CMAS mode for the cellular connection. During CMAS mode, the UE 110 is configured to monitor for paging messages at least once each DRX cycle.

In 415, the UE 110 receives information related to the CMAS transmission pattern that is to be implemented by the network. Information related to the CMAS transmission pattern may include, but is not limited to, an indication of a number of paging repetitions (e.g., 2, 4, 8, 16, 20, 25, etc.) and an indication of a number of DRX cycles between each repetition (e.g., 0, 2, 4, 8, 16, 20, 25, etc.). To provide an example, the timeline 320 of FIG. 3A illustrates two paging repetitions 322, 324 with zero DRX cycles between each repetition. Returning to FIG. 4, information related to the CMAS transmission pattern may also include the duration of the CMAS message, the duration of the SIB 12 and/or a repeat duration that indicates when the entire CMAS transmission patterns may be repeated.

A cellular network may provide the UE 110 with information related to the CMAS transmission pattern that is to be implemented by the network in any of a variety of different ways. In one example, the network may include the information related to the CMAS transmission pattern in a SIB. For instance, the network may include an indication of a number of paging repetitions and a number of DRX cycles between each repetition in a SIB 1, an on-demand SIB or a Public Warning System (PWS) SIB that can be used by a wearable or IoT type of device. In another example, the 5G NR-RAN 122 may provide this information to the UE 110 by downlink control information (DCI). Throughout this description, reference to any particular type of information related to the CMAS transmission pattern or any particular way to provide this information to the UE 110 is merely exemplary. Different networks may refer to similar information or signals by a different name.

Alternatively, instead of providing the UE 110 with multiple parameters related to the CMAS transmission pattern, the network may provide the UE 110 with a CMAS scheduling index that can be mapped into a predefined CMAS scheduling configuration. For example, the scheduling index may be preloaded on the UE 110. During operation, information related to the CMAS transmission pattern that is to be implemented by the network may be indicated by a single CMAS scheduling index value. When the UE 110 receives a CMAS scheduling index value, the UE 110 may reference the preloaded scheduling index and determine both the number of paging repetitions and the number of DRX cycles between each repetition that the network is configured to utilize for the CMAS transmission pattern.

Figure 5:
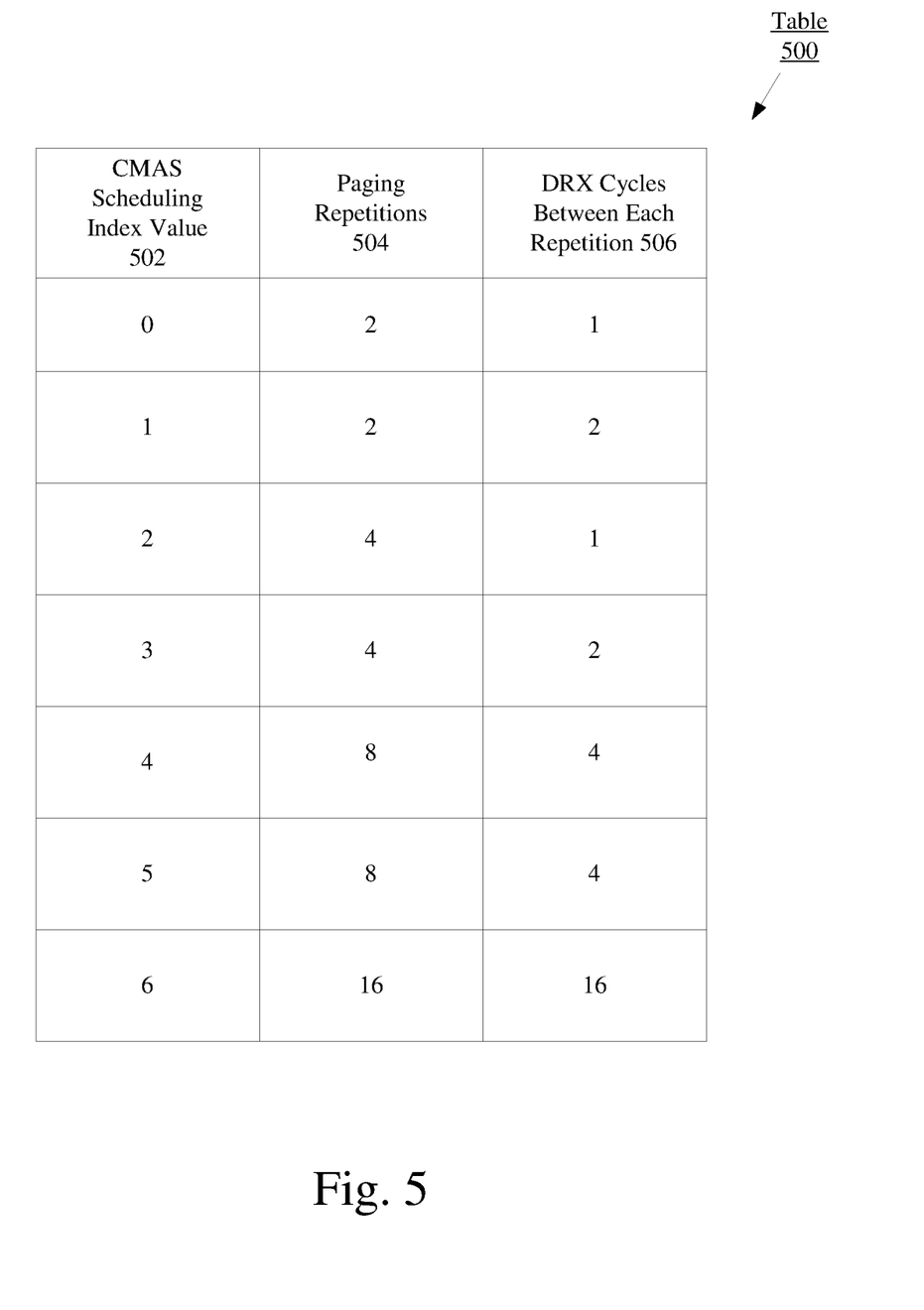
FIG. 5 includes a table 500 that shows CMAS scheduling index values mapped into a predefined CMAS scheduling configuration according to various exemplary embodiments.

FIG. 5 includes a table 500 that shows CMAS scheduling index values mapped into a predefined CMAS scheduling configuration according to various exemplary embodiments. The table 500 shows scheduling index values mapped to both a number of paging repetitions and a number of DRX cycles between each repetition. Column 502 of the table 500 includes exemplary scheduling index values. Column 504 of the table 500 includes exemplary values for paging repetitions and column 506 of the table 500 includes exemplary values for the number of DRX cycles between each paging repetition. The scheduling index values are mapped to the other values of the same row. For instance, the table 500 demonstrates that if the UE 110 receives the scheduling index value of zero, the UE 110 may determine that the network is to utilize two paging repetitions with one DRX cycle between each repetition based on the scheduling index value.

Returning to the method 400, in 420, the UE 110 generates an updated CMAS monitoring schedule based on the information related to the CMAS transmission pattern. From the network perspective, the DRX cycle duration will remain unchanged. From the UE 110 perspective, the DRX cycle duration may increase and thus, the UE 110 may increase the duration in which the UE 110 is in the sleep mode of inactivity. Accordingly, there may be instances where the network sends a paging message to the UE 110 but the UE 110 is not monitoring for the paging message. However, the information related to the CMAS transmission pattern may enable the UE 110 to configure an updated CMAS monitoring schedule that ensures at least one of the initial CMAS indication or a subsequent retransmitted CMAS indication will be received by the UE 110.

In the following exemplary scenario, the information related to the CMAS transmission pattern indicates that the network is configured to utilize two paging repetitions with zero DRX cycles in between. As mentioned above in 405, the DRX cycle duration provided by the cellular network may be 1.28 seconds. Two paging repetitions with zero DRX cycles indicates that for a 2.56 second duration, the same CMAS message will be transmitted twice. Accordingly, the UE 110 may generate an updated CMAS monitoring schedule where the UE 110 is configured to monitor for CMAS indications only once every 2.56 seconds. This ensures that if the UE 110 receives the initial CMAS indication, the UE 110 will not be in an active mode of processing during the retransmitted CMAS indication. Alternatively, if the UE 110 misses the initial CMAS indication, the UE 110 will be in an active mode of processing during the retransmitted CMAS indication. Thus, the updated CMAS mode may enable the UE 110 to increase power saving benefits without decreasing the likelihood that the UE 110 will receive a CMAS message if the CMAS message is transmitted.

Throughout this description, any reference to a particular configuration for the updated CMAS monitoring schedule is merely provided for illustrative purposes. The exemplary embodiments may apply to any updated CMAS monitoring schedule that enables the UE 110 to increase power saving benefits without decreasing the likelihood that the UE 110 will receive a CMAS message if the CMAS message is transmitted.

In 425, the UE 110 activates updated CMAS mode. As mentioned above, updated CMAS mode employs similar mechanisms to CMAS mode. However, unlike CMAS mode which monitors for a CMAS indication each conventional DRX cycle, updated CMAS mode monitors for a CMAS indication in accordance with the updated CMAS monitoring schedule.

Activating updated CMAS mode is not limited to the exemplary scenarios described above. For instance, a simultaneous connection to a non-cellular network (WLAN 126) is not required. The UE 110 may be configured to initiate the activation of updated CMAS mode based on the battery power of the UE 110 satisfying a predetermined threshold. In another example, the UE 110 may be configured to initiate the activation of updated CMAS mode based on channel conditions, network conditions, connection issues related to the corresponding cellular network or any combination thereof. In a further example, the UE 110 may be a battery powered device with the sole purpose of providing CMAS indications.

Figure 6:
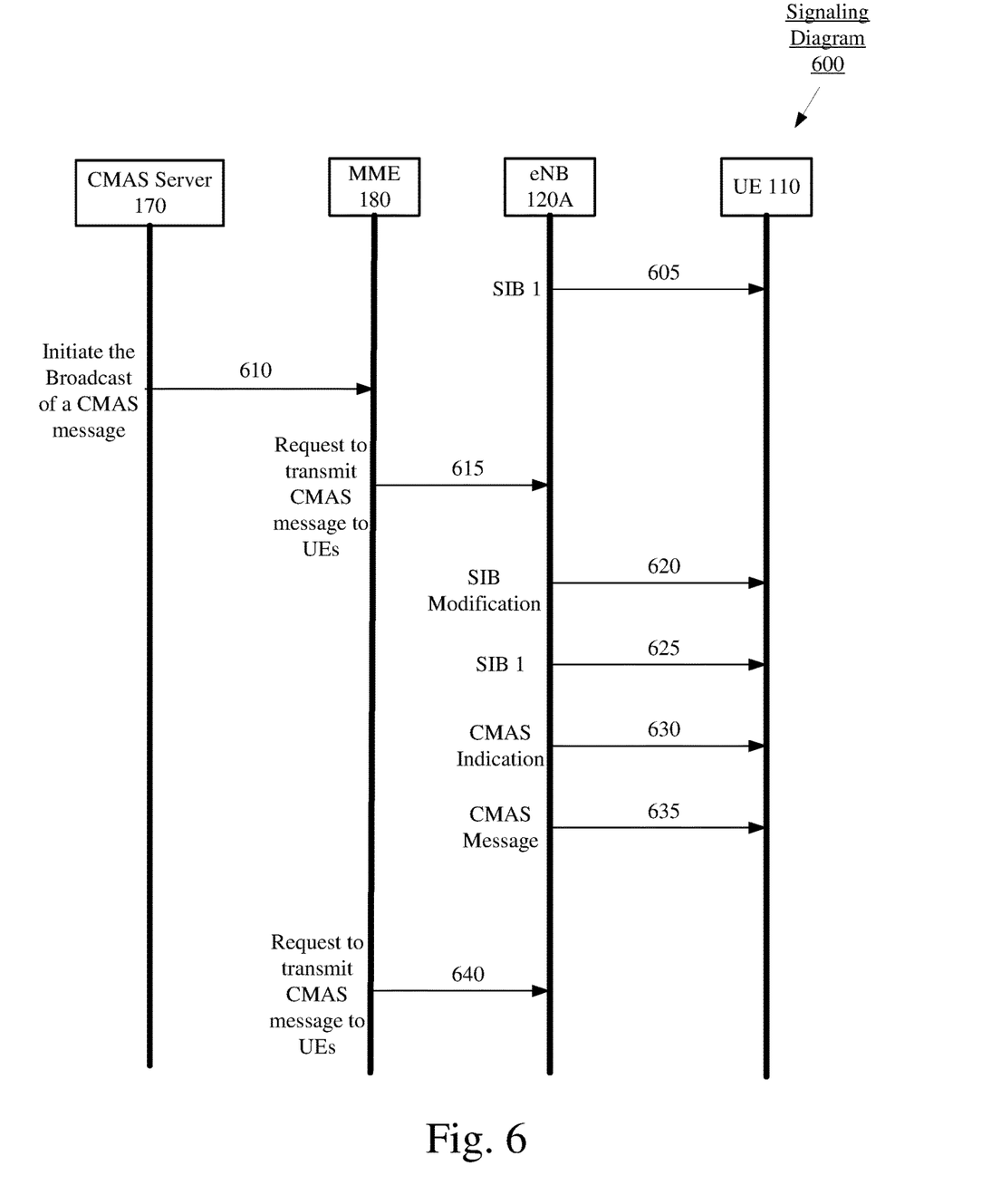
FIG. 6 shows a signaling diagram that relates to dynamically altering the CMAS transmission pattern

FIG. 6 shows a signaling diagram 600 that relates to dynamically altering the CMAS transmission pattern. The signaling diagram will be described with regard to the network arrangement 100 of FIG. 1, the UE 110 of FIG. 2 and the method 400 of FIG. 4.

In the following exemplary scenario, the UE 110 is camped on the eNB 120A of the LTE-RAN 120. Initially, the UE 110 is operating in CMAS mode.

In 605, the eNB 120A transmits a SIB 1 to the UE 110. As mentioned above with regard to 415 of the method 400, the network may include information related to the CMAS transmission pattern in a SIB 1. As mentioned above with regard to 420-425 of the method 400, the UE 110 may generate a first updated CMAS monitoring schedule based on the information related to the CMAS transmission pattern. Subsequently, the UE 110 may activate updated CMAS mode and operate in accordance with the first updated CMAS monitoring schedule. The network has not yet initiated the broadcast of a CMAS message. Accordingly, the network may set its CMAS transmission pattern parameters to maximize the amount of time the UE 110 is in the sleep mode during updated CMAS mode.

In 610, the CMAS server 170 is triggered to initiate the broadcast of a CMAS message. Accordingly, the CMAS server 170 transmits signal to a mobile management entity (MME) 180 of the LTE-RAN 120. The MME 180 may be a network entity included in the cellular core network 130. The signal may include various information and/or data related to the broadcast of a CMAS message. For example, the signal may include the emergency alert that is to be included when the CMAS message is broadcast.

In 615, the MME 180 transmits a request to the eNB 120A to transmit a CMAS message to UEs within at least a portion of its tracking area. The request may include the information and/or data received from the CMAS server 170 in 510. The request may also include various CMAS transmission pattern parameters.

In 620, the eNB 120A transmits a SIB modification message to the UE 110. This message may be intended to trigger the UE 110 to listen for a subsequent SIB 1 to be transmitted by the eNB 120A. As mentioned above, the network previously set its CMAS transmission pattern parameters to maximize the amount of time UE 110 is in the sleep mode of inactivity because the broadcast of a CMAS message had not yet been initiated. However, now that the broadcast of a CMAS message has been initiated, the network may update its CMAS transmission pattern parameters. For example, the network may modify the operating values of the CMAS transmission pattern parameters with the intention of causing the UE 110 to increase the instances in which the UE 110 monitors for the CMAS indication. This improves latency related to the reception of the CMAS message at the UE 110. In one exemplary embodiment, the modified operating values for the CMAS transmission pattern parameters may be based on the type of emergency alert. Thus, a first type of emergency alert and a second type of emergency alert may have different operating values for the CMAS transmission pattern parameters. The exemplary embodiments may modify the CMAS transmission pattern parameters for any appropriate reason. Accordingly, the SIB modification message enables the eNB 120A to inform the UE 110 that these parameters have been updated and can be found in a subsequent SIB 1.

In 625, the eNB 120A transmits the SIB 1. Accordingly, the UE 110 may generate a second updated CMAS monitoring schedule to adapt to the CMAS transmission pattern parameters indicated in the SIB 1.

In 630, the eNB 120A transmits a CMAS indication to the UE 110 in a paging message via the PDCCH. The UE 110, operating in updated CMAS mode, decodes the paging message and identifies the CMAS indication.

In 635, the eNB 120A transmits the CMAS message in a SIB 12 via the PDSCH. The UE 110 is able to receive the SIB 12 based on the CMAS indication received during 530. The eNB 120A may perform the 630 and 635 signaling a plurality of times in accordance with the CMAS transmission pattern parameters.

At a conclusion of a timer operated by the MME 180 keeping track of the repeat duration that indicates when the entire CMAS transmission patterns may be repeated, the MME 180 may repeat 515.

Any reference to a particular signal or network entity in the above described signaling diagram is merely provided for illustrative purposes. Different networks may refer to similar network entities and similar signals by different names. For example, in 5G NR, the operations performed by the MME 180 of the LTE-RAN 120 may be performed by an Access and Mobility Management Function (AMF) and the operations performed by the eNB 120A may be performed by a gNB.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
at a user equipment (UE) associated with a base station, the UE and the base station configured with a Discontinuous Reception (DRX) functionality, the DRX functionality including a plurality of onDurations, wherein the UE is configured to monitor for downlink signals during each of the plurality of onDurations:
receiving an indication of at least one parameter the base station is to utilize for the transmission of an emergency message while the UE is operating in radio resource control (RRC) idle state;
receiving a system information block (SIB) modification, wherein the SIB modification indicates that the at least one parameter has been modified by the base station;
generating an emergency message monitoring schedule based on the indication of the at least one parameter, wherein the emergency message monitoring schedule includes a first subset of the plurality of onDurations aligned with time durations the base station is scheduled and omits a second subset of the plurality of onDurations; and
activating a mode of operation for monitoring for the emergency message where the UE configures the DRX functionality based on the emergency message monitoring schedule.

2. The method of claim 1, wherein monitoring for the emergency message includes determining whether an emergency message indication is received by the UE via a physical downlink control channel (PDCCH).

3. The method of claim 2, further comprising:
when the emergency message indication is received, monitoring a physical downlink shared channel (PDSCH) for the emergency message based on the emergency message indication.

4. The method of claim 1, wherein the at least one parameter includes a number of paging repetitions or a number of DRX cycles between each paging repetition.

5. The method of claim 1, wherein the indication of the at least one parameter is included in a SIB.

6. The method of claim 1, wherein the indication of the at least one parameter is included in downlink control information (DCI) of a paging message.

7. The method of claim 1, wherein the emergency message is one a Commercial Mobile Alert System (CMAS) message, a Wireless Emergency Alert (WEA), an Earthquake and Tsunami Warning System (ETWS) message or a Public Warning System (PWS) message.

8. A user equipment (UE), comprising:
a transceiver configured to establish a connection with a base station, the UE and the base station configured with a Discontinuous Reception (DRX) functionality, the DRX functionality including a plurality of onDurations, wherein the UE is configured to monitor for downlink signals during each of the plurality of onDurations; and
a processor configured to perform operations comprising:
receive an indication of at least one parameter the base station is to utilize for the transmission of an emergency message while the UE is operating in radio resource control (RRC) idle state;

receive a system information block (SIB) modification, wherein the SIB modification indicates that the at least one parameter has been modified by the base station;

generate an emergency message monitoring schedule based on the indication of the at least one parameter, wherein the emergency message monitoring schedule includes a first subset of the plurality of onDurations aligned with time durations the base station is scheduled and omits a second subset of the plurality of onDurations; and activate a mode of operation for monitoring for the emergency message where the UE configures the DRX functionality based on the emergency message monitoring schedule.

9. The UE of claim 8, wherein monitoring for the emergency message includes determining whether an emergency message indication was received via a physical downlink control channel (PDCCH).

10. The UE of claim 8, wherein the at least one parameter includes a number of paging repetitions or a number of DRX cycles between each paging repetition.

11. The UE of claim 8, wherein the at least one parameter is related to an emergency message transmission pattern that is to be implemented by the base station.

12. The UE of claim 8, wherein the indication of the at least one parameter is included in one of a SIB or a downlink control information (DCI) of a paging message.

13. The UE of claim 8, wherein the UE activates the mode of operation based on at least one of a battery power of the UE satisfying a predetermined threshold or a channel condition parameter satisfying a predetermined threshold.

14. The UE of claim 8, wherein the emergency message is one a Commercial Mobile Alert System (CMAS) message, a Wireless Emergency Alert (WEA), an Earthquake and Tsunami Warning System (ETWS) message or a Public Warning System (PWS) message.

15. A method comprising:

at a base station associated with a user equipment (UE), the base station and the UE configured with a Discontinuous Reception (DRX) functionality:

transmitting information corresponding to an emergency message pattern that the base station is to utilize for the transmission of an emergency message, wherein the information corresponding to an emergency message pattern is transmitted in a system information block (SIB);

receiving a request to transmit the emergency message, wherein the request to transmit the emergency message is received from a mobile management entity (MME);

transmitting the emergency message a plurality of times based on the emergency message pattern;

modifying the emergency message pattern based on a type of emergency alert;

transmitting a SIB modification to at least one UE operating in radio resource control (RRC) idle state;

transmitting information corresponding to the modified emergency message pattern; and transmitting the emergency message a plurality of times based on the modified emergency message pattern.

16. The UE of claim 8, wherein the UE activates the mode of operation based on at least the quality of the connection with the base station degrading below a predetermined threshold.

* * * * *